(12) United States Patent
Gomezcaballero et al.

(10) Patent No.: US 11,024,051 B2
(45) Date of Patent: Jun. 1, 2021

(54) OBJECT DETECTION DEVICE

(71) Applicant: HITACHI AUTOMOTIVE SYSTEMS, LTD., Hitachinaka (JP)

(72) Inventors: Felipe Gomezcaballero, Tokyo (JP); Masayuki Takemura, Tokyo (JP); Shinichi Nonaka, Tokyo (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 102 days.

(21) Appl. No.: 16/346,029

(22) PCT Filed: Dec. 7, 2017

(86) PCT No.: PCT/JP2017/043937
§ 371 (c)(1),
(2) Date: Apr. 29, 2019

(87) PCT Pub. No.: WO2018/116841
PCT Pub. Date: Jun. 28, 2018

(65) Prior Publication Data
US 2019/0266745 A1    Aug. 29, 2019

(30) Foreign Application Priority Data

Dec. 19, 2016  (JP) .............................. JP2016-245529

(51) Int. Cl.
*G06K 9/00*    (2006.01)
*G06T 7/70*    (2017.01)
(Continued)

(52) U.S. Cl.
CPC .................. *G06T 7/70* (2017.01); *G01C 3/06* (2013.01); *G06K 9/00798* (2013.01);
(Continued)

(58) Field of Classification Search
CPC .. G06T 7/593; G06T 1/00; G06T 7/00; G06T 2207/10012; G06T 2207/20228;
(Continued)

(56) References Cited

U.S. PATENT DOCUMENTS 5,874,904 A * 2/1999 Hirabayashi ............ G06T 7/593
340/903
7,437,243 B2 * 10/2008 Fujimoto .................. G06T 7/20
340/436

(Continued)

FOREIGN PATENT DOCUMENTS

EP      2 040 196 A1      3/2009
EP      2040196 A1 *     3/2009  .......... G06K 9/00798
(Continued)

OTHER PUBLICATIONS

Real Time Obstacle Detection in Stereovision on Non Flat Road Geometry Through V-disparity Representation, Raphael Labayrade et al., IEEE, Jun. 21, 2002, pp. 646-651 (Year: 2002).*
(Continued)

*Primary Examiner* — Jayesh A Patel
(74) *Attorney, Agent, or Firm* — Foley & Lardner LLP

(57) ABSTRACT

The purpose of the present invention is to provide an object detection device which is capable of accurately estimating the height of a road surface and is capable of reliably detecting an object present on the road surface. This object detection device 1 detects objects upon a road surface, and is equipped with: a stereo camera 110 for capturing images of the road surface 101a and the road shoulder 101b and generating image data; a three-dimensional data generation unit 210 for calculating disparity data for the pixels in the image data; a shoulder structure detection unit 310 for using the disparity data and/or the image data to detect shoulder structures; a structure ground-contact position derivation unit 410 for deriving the ground-contact position of a
(Continued)

shoulder structure; a road surface position estimation unit 510 for estimating the height of the road surface 101a from the ground-contact position of the shoulder structure; and an object detection unit 610 for detecting an object 105 upon the road surface 101a by using the disparity data and the road surface height to separate disparity data corresponding to the road surface 101a and disparity data for the object.

4 Claims, 5 Drawing Sheets

(51) Int. Cl.

| | |
|---|---|
| *G01C 3/06* | (2006.01) |
| *G06T 7/60* | (2017.01) |
| *G06T 1/00* | (2006.01) |
| *G08G 1/16* | (2006.01) |
| *G06T 7/00* | (2017.01) |
| *G06T 7/593* | (2017.01) |

(52) U.S. Cl.
CPC ............ *G06K 9/00805* (2013.01); *G06T 1/00* (2013.01); *G06T 7/00* (2013.01); *G06T 7/593* (2017.01); *G06T 7/60* (2013.01); *G08G 1/16* (2013.01); *G06T 2207/10012* (2013.01); *G06T 2207/20228* (2013.01); *G06T 2207/30256* (2013.01); *G06T 2207/30261* (2013.01)

(58) Field of Classification Search
CPC .......... G06T 2207/30256; G06T 2207/30261; G06K 9/00798; G06K 9/00805
See application file for complete search history.

(56) References Cited

U.S. PATENT DOCUMENTS

| | | | | |
|---|---|---|---|---|
| 8,867,792 B2* | 10/2014 | Kishida | ............ | G06K 9/00818 382/104 |
| 8,873,803 B2* | 10/2014 | Shima | ............ | G06T 7/136 382/103 |
| 9,122,936 B2* | 9/2015 | Seki | ............ | G06K 9/00812 |
| 9,242,601 B2* | 1/2016 | You | ............ | G06K 9/4647 |
| 10,580,155 B2* | 3/2020 | Sumiyoshi | ............ | H04N 13/239 |
| 10,755,116 B2* | 8/2020 | Nakata | ............ | G05D 1/0246 |
| 10,762,656 B2* | 9/2020 | Motohashi | ............ | G06T 3/60 |
| 2003/0099377 A1 | 5/2003 | Hanawa | | |
| 2004/0096082 A1* | 5/2004 | Nakai | ............ | G06T 7/593 382/104 |
| 2006/0206243 A1* | 9/2006 | Pawlicki | ............ | G06K 9/00825 701/1 |
| 2007/0127777 A1* | 6/2007 | Fujimoto | ............ | G06K 9/00798 382/104 |
| 2008/0199069 A1* | 8/2008 | Schick | ............ | H04N 13/239 382/154 |
| 2008/0273750 A1* | 11/2008 | Fujimoto | ............ | G06K 9/00362 382/103 |
| 2009/0085913 A1 | 4/2009 | Sakamoto et al. | | |
| 2009/0167844 A1* | 7/2009 | Seki | ............ | B60R 1/00 348/47 |
| 2009/0214081 A1* | 8/2009 | Nakano | ............ | G06T 7/248 382/103 |
| 2010/0235035 A1* | 9/2010 | Nishira | ............ | G08G 1/165 701/31.4 |
| 2011/0261168 A1* | 10/2011 | Shima | ............ | G06T 7/70 348/47 |
| 2011/0311130 A1* | 12/2011 | Ichimori | ............ | G06T 7/593 382/154 |
| 2012/0010808 A1* | 1/2012 | Yokoyama | ............ | G08G 1/166 701/301 |
| 2012/0185167 A1* | 7/2012 | Higuchi | ............ | G06T 7/70 701/461 |
| 2012/0288154 A1* | 11/2012 | Shima | ............ | G06T 7/11 382/103 |
| 2013/0128001 A1* | 5/2013 | You | ............ | G06K 9/00208 348/47 |
| 2013/0163821 A1* | 6/2013 | You | ............ | G06K 9/00798 382/104 |
| 2014/0086451 A1* | 3/2014 | Liu | ............ | G06K 9/00798 382/103 |
| 2014/0267630 A1* | 9/2014 | Zhong | ............ | G06K 9/00798 348/47 |
| 2015/0049913 A1* | 2/2015 | Zhong | ............ | G06K 9/00798 382/104 |
| 2015/0165972 A1* | 6/2015 | Takemae | ............ | G06T 7/593 348/148 |
| 2015/0210312 A1* | 7/2015 | Stein | ............ | G06K 9/00805 701/41 |
| 2015/0227800 A1* | 8/2015 | Takemae | ............ | G06K 9/00798 382/104 |
| 2015/0332103 A1* | 11/2015 | Yokota | ............ | G01C 21/3667 348/149 |
| 2015/0332114 A1* | 11/2015 | Springer | ............ | G06K 9/00805 348/148 |
| 2015/0356358 A1* | 12/2015 | Okada | ............ | G06K 9/00973 382/103 |
| 2015/0371095 A1* | 12/2015 | Hartmann | ............ | G06K 9/6267 348/148 |
| 2016/0014406 A1* | 1/2016 | Takahashi | ............ | G06T 7/246 348/148 |
| 2016/0019429 A1* | 1/2016 | Ishigaki | ............ | G01B 11/026 348/47 |
| 2016/0253575 A1* | 9/2016 | Kakegawa | ............ | G06K 9/6212 701/70 |
| 2017/0098132 A1* | 4/2017 | Yokota | ............ | G06K 9/00805 |
| 2017/0220877 A1* | 8/2017 | Kakegawa | ............ | G06K 9/00805 |
| 2017/0262734 A1* | 9/2017 | Nakata | ............ | G06K 9/00805 |
| 2018/0365846 A1* | 12/2018 | Sumiyoshi | ............ | G06T 7/593 |
| 2019/0005338 A1* | 1/2019 | Watanabe | ............ | G06T 7/60 |
| 2019/0014302 A1* | 1/2019 | Watanabe | ............ | G06K 9/44 |

FOREIGN PATENT DOCUMENTS

| | | | | |
|---|---|---|---|---|
| EP | 2662804 A2 * | 11/2013 | ......... | G06K 9/00798 |
| JP | H11-213138 A | 8/1999 | | |
| JP | 2009-075938 A | 4/2009 | | |
| JP | 2011-022995 A | 2/2011 | | |
| JP | 2013-140515 A | 7/2013 | | |
| JP | 2013239168 A * | 11/2013 | ......... | G06K 9/00798 |
| JP | 2015-179302 A | 10/2015 | | |
| WO | WO-2008107944 A1 * | 9/2008 | ............ | H04N 7/183 |
| WO | WO-2015053100 A1 * | 4/2015 | ............ | G08G 1/165 |
| WO | WO-2015/163028 A1 | 10/2015 | | |

OTHER PUBLICATIONS

Road Segmentation Supervised by an Extended V-Disparity Algorithm for Autonomous Navigation, Nicolas Soquet et al., IEEE,1-4244-1068-1, 2007, pp. 160-165 (Year: 2007).*
Stereovision approach Non-Planar roads, Sergiu Nedevschi et al., ICINCO, 10.5220/0001139300110018, 2004, pp. 11-18 (Year: 2004).*
U-V-Disparity: An efficient algorithm for Stereovision Based Scene Analysis, Zhencheng Hu et al., IEEE,0-7803-8961 -1, 2005, pp. 48-54 (Year: 2005).*
Extended European Search Report issued in corresponding European Patent Application No. 17883461.0 dated Jul. 17, 2020.
R. Labayrade et al., "Real Time Obstacle Detection in Stereovision on Non Flat Road Geometry Through 'V-Disparity' Representation", Intelligent Vehicle Symposium, 2002, IEEE Jun. 17-21, 2002, vol. 2, Jun. 21, 2002, pp. 646-651.
S. Nedevschi et al., "Stereovision Approach for Obstacle Detection on Non-Planar Roads", Proceedings of the First International Conference on Informatics in Control, Automation and Robotics, Aug. 25, 2004, pp. 11-18.
International Search Report with English translation and Written Opinion issued in corresponding application No. PCT/JP2017/043937 dated Apr. 10, 2018.

(56) References Cited

OTHER PUBLICATIONS

Office Action issued in corresponding Japanese Patent Application No. 2016-245529 dated Aug. 25, 2020, with English translation.

* cited by examiner (a)

(b)

(a)

(b)

(a)

(b)

OBJECT DETECTION DEVICE

TECHNICAL FIELD

The present invention relates to an object detection device.

BACKGROUND ART

For example, an image processing device detecting a three-dimensional object has been known as a device that monitors an intrusion of a suspicious person and other abnormalities and supports driving of an automobile, and there is a demand for the above image processing device to secure safety by detecting an automobile or a pedestrian around a host vehicle particularly in the field of automobiles.

As such an image processing device, for example, a technique of detecting an object on a road surface using a plurality of images captured by a stereo camera is disclosed (see, for example, PTL 1). According to this technique, information on a disparity obtained from the plurality of images is used to prevent confusion between a road surface and an object present on the road surface so that it is possible to detect the object on the road surface.

CITATION LIST

Patent Literature

PTL 1: JP 2015-179302 A

SUMMARY OF INVENTION

Technical Problem

In the conventional image processing device as described above, however, when an environment, such as a road surface around a traveling automobile, is not suitable for generating disparity information, it is difficult to distinguish between an object and a road surface accompanying a decrease in position detection accuracy of the road surface. As a result, there is a risk that an object actually present on the road surface is not detected or erroneous detection of the object is caused by incorrect disparity information.

The present invention has been made based on the above circumstances, and the purpose thereof is to provide an object detection device which is capable of accurately estimating the height of a road surface and is capable of reliably detecting an object present on the road surface.

Solution to Problem

The present invention relates to (1) an object detection device, which detects objects upon a road surface, including:

a stereo camera for capturing images of the road surface and a road shoulder and generating image data;

a three-dimensional data generation unit for using the image data generated by the stereo camera to calculate disparity data for pixels in the image data;

a shoulder structure detection unit for using the disparity data and/or the image data to detect predetermined structures installed on the road shoulder;

a structure ground-contact position derivation unit for deriving a ground-contact position of the structure detected by the shoulder structure detection unit;

a road surface position estimation unit for estimating the height of the road surface from the ground-contact position of the structure; and an object detection unit for detecting the object upon the road surface by using the disparity data generated by the three-dimensional data generation unit and the height of the road surface estimated by the road surface position estimation unit to separate disparity data corresponding to the road surface and disparity data other than the disparity data from the disparity data generated by the three-dimensional data generation unit, (2) the object detection device according to (1) in which the road surface position estimation unit uses the ground-contact position of the structure to estimate the height of the road surface for each position in a line-of-sight direction of the stereo camera, (3) the object detection unit according to (1) or (2) in which the structure ground-contact position derivation unit uses disparity data of the structure and/or image data of the structure to drive the ground-contact position of the structure, and (4) the object detection unit according to any one of (1) to (3), further including a database in which height information of the structure is stored, in which the structure ground-contact position derivation unit uses the disparity data of the structure and the height information of the structure stored in the database to derive the ground-contact position of the structure.

Incidentally, a "road shoulder" in the present specification means the surroundings of a road surface on which an automobile travels, and is a concept including side and upper regions of the road surface. In addition, a "ground-contact position" means a position where a structure installed in the road shoulder is in contact with the ground. In addition, "detecting an object" means processing that includes at least one of specifying a position of an object in a three-dimensional space, specifying velocity of the object, and specifying a type of object (for example, an automobile, a motorcycle, a bicycle, a pedestrian, a pole, or the like).

Advantageous Effects of Invention

The present invention can provide the object detection device which is capable of accurately estimating the height of the road surface and is capable of reliably detecting the object present on the road surface.

BRIEF DESCRIPTION OF DRAWINGS

FIG. 1(a) and FIG. 1(b) illustrate a scene viewed from a host vehicle and a block diagram of an object detection device, respectively.

DESCRIPTION OF EMBODIMENTS

Figure 1:
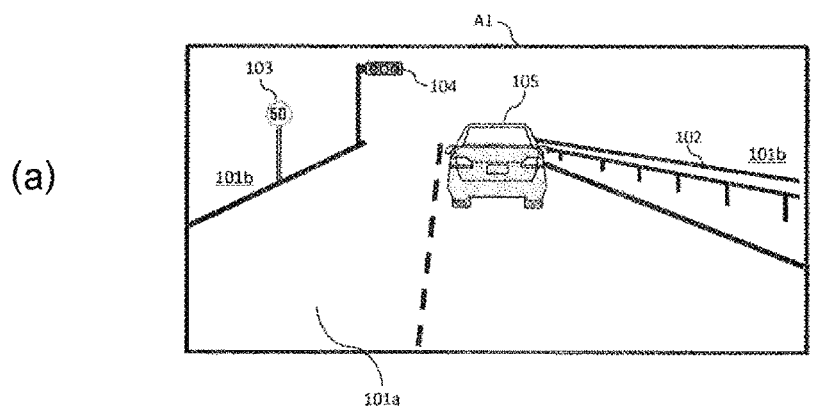
FIG. 1 is a schematic view for describing a first embodiment of the present invention.
Figure 1:
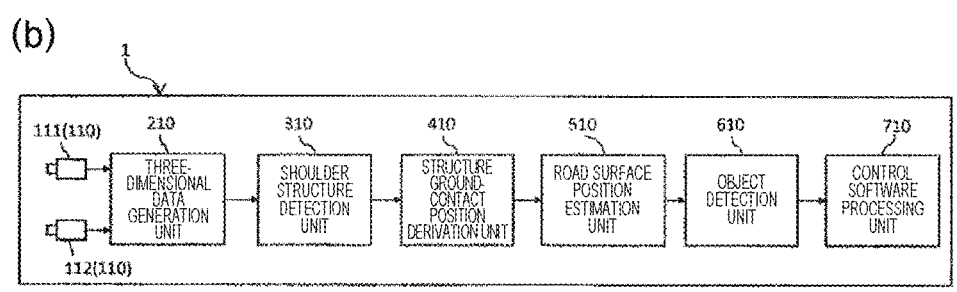

An object detection device of the present invention is an object detection device, which detects objects upon a road surface, including: a stereo camera for capturing images of the road surface and a road shoulder and generating image data; a three-dimensional data generation unit for using the image data generated by the stereo camera to calculate disparity data for pixels in the image data; a shoulder structure detection unit for using the disparity data and/or the image data to detect predetermined structures installed on the road shoulder; a structure ground-contact position derivation unit for using disparity data of the structure detected by the shoulder structure detection unit to derive a ground-contact position of the structure; a road surface position estimation unit for estimating the height of the road surface from a ground-contact position of the structure; and an object detection unit for detecting the object upon the road surface by using the disparity data generated by the three-dimensional data generation unit and the height of the road surface estimated by the road surface position estimation unit to separate disparity data corresponding to the road surface and disparity data other than the disparity data from the disparity data generated by the three-dimensional data generation unit.

Hereinafter, first and second embodiments of the object detection device of the present invention will be described with reference to the drawings, but the present invention is not limited only to the embodiments described in the drawings.

Incidentally, a "shoulder structure" in the present specification means a predetermined structure installed in the road shoulder. Examples of the predetermined structure include a shoulder structure 102 (a guardrail), a shoulder structure 103 (a traffic sign), a shoulder structure 104 (a traffic light), and the like illustrated in FIG. 1 to be described later.

First Embodiment

FIG. 1 is a schematic view for describing a first embodiment of the present invention. As illustrated in FIG. 1(b), the object detection device 1 is constituted schematically by a stereo camera 110, a three-dimensional data generation unit 210, a shoulder structure detection unit 310, a structure ground-contact position derivation unit 410, a road surface position estimation unit 510, an object detection unit 610, and a control software processing unit 710.

The stereo camera 110 captures images of a road surface 101a and a road shoulder 101b around a host vehicle and generates image data, and has a pair of camera sensors 111 and 112 capturing the images of the road surface 101a and the road shoulder 101b.

The three-dimensional data generation unit 210 uses the image data generated by the stereo camera 110 to calculate disparity data (three-dimensional distance image data) for each pixel in the image data. This disparity data can be obtained by applying a known stereo matching technique using the image data captured by the camera sensors 111 and 112.

Here, the above-described stereo matching technique determines a unit region so as to minimize a difference between image signals for each predetermined unit region in two images which have been captured using the camera sensors 111 and 112 and are compared with each other. That is, a region where the same object is projected is detected, thereby forming a three-dimensional distance image. Hereinafter, the three-dimensional distance image is referred to as a "disparity image", and particularly, an image of which a vertical direction is represented by a position V in the vertical direction and a horizontal direction is represented by a disparity value at the position V is referred to as a "V-disparity image".

The shoulder structure detection unit 310 uses the disparity data calculated by the three-dimensional data generation unit 210 and/or the image data obtained by the camera sensors 111 and 112 to search for a predetermined pattern corresponding to a shoulder structure from the image data, thereby detecting the shoulder structure installed on the road shoulder 101b.

The structure ground-contact position derivation unit 410 derives a ground-contact position of the shoulder structure detected by the shoulder structure detection unit 310. A derivation method of the ground-contact position is not particularly limited, and the structure ground-contact position derivation unit preferably uses disparity data of the shoulder structure and/or image data of the shoulder structure to drive the ground-contact position of the shoulder structure. For example, a known technique can be used as the derivation method. As a result, it is possible to reliably derive the ground-contact position of the shoulder structure.

Incidentally, when a detected shoulder structure extends in a line-of-sight direction of the stereo camera 110 (a progressing direction of the host vehicle), such as a guiderail, at the time of deriving the ground-contact position of the shoulder structure, ground-contact positions of the shoulder structure may be calculated at predetermined intervals along the line-of-sight direction.

In addition, the structure ground-contact position derivation unit 410 may use the derived ground-contact position of the shoulder structure and the image data generated by the stereo camera 110 to calculate the height of the top of the shoulder structure from the ground (the height of the shoulder structure). As a result, when the height of the shoulder structure is out of a predetermined range, the object detection device 1 can cause the ground-contact position of the shoulder structure not to be used to estimate the road surface height as an abnormal value and can further improve the estimation accuracy of the height of the road surface 101a.

As such a mode, there is an example in which information on a shoulder structure is not used, for example, in a case where a height range for installing a structure such as a traffic light is defined since it is obviously considered that the shoulder structure has been erroneously determined when the detected height of the shoulder structure is out of the above range.

The road surface position estimation unit 510 estimates the height of the road surface 101a using the ground-contact position of the shoulder structure derived by the structure ground-contact position derivation unit 410. A method for estimating the height of the road surface 101a is not particularly limited, and for example, a known technique can be used. Here, the height of the road surface 101a is represented as the height with respect to a plane defined in advance (such as a predetermined horizontal plane).

Incidentally, the above-described road surface position estimation unit 510 preferably uses the ground-contact position of the shoulder structure to estimate the height of the road surface 101a for each position (segment) in the line-of-sight direction of the stereo camera 110. As a result, the object detection device 1 can more accurately estimate the height of each portion of the road surface 101a such as an undulating state in the line-of-sight direction.

The object detection unit 610 uses the disparity data generated by the three-dimensional data generation unit 210 and the height of the road surface 101a estimated by the road surface position estimation unit 510 to separate disparity data corresponding to the road surface 101a and disparity data other than the disparity data from the above disparity data, thereby detecting an object on the road surface 101a (for example, a car 105 traveling in front of the host vehicle as illustrated in a scene A1 of FIG. 1(a)). A method for detecting the object on the road surface 101a is not particularly limited, and for example, a known technique (for example, a technique described in JP 2009-146217 A or the like) can be used.

In addition, the object detection unit 610 may detect an object on the road surface 101a by using the image data obtained by at least one of the camera sensors 111 and 112 in the stereo camera 110 in addition to the disparity data and the height of the road surface 101a described above from the viewpoint of improving the detection accuracy of the object.

The control software processing unit 710 controls the host vehicle so as to cope with an object detected by the above-described object detection unit 610 and movement of the object. The control software processing unit 710 incorporates control software capable of controlling the host vehicle in accordance with the movement of the object, and movement of the host vehicle is controlled based on a command from the control software. As the control software, for example, known automatic driving assistance software or the like can be adopted.

Here, processes executed by the shoulder structure detection unit 310 and the road surface position estimation unit 510 among the above-described units will be described in detail below.

Figure 2:
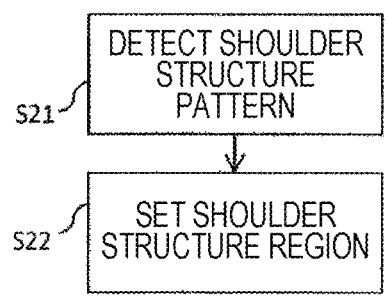
FIG. 2 is a schematic flowchart for executing detection of a shoulder structure of FIG. 1.

First, FIG. 2 is a schematic flowchart for executing detection of the shoulder structure of FIG. 1.

The shoulder structure detection unit 310 acquires one piece of image data out of the image data obtained by the stereo camera 110 and detects the shoulder structure 102 (the guardrail), the shoulder structure 103 (the traffic sign), the shoulder structure 104 (the traffic light), and the like illustrated in FIG. 1 from a specific pattern included in the image (Step S21).

Next, the shoulder structure detection unit 310 specifies a region where the shoulder structure detected in Step S21 is located. Incidentally, the specified region is used in the structure ground-contact position derivation unit 410 and the road surface position estimation unit 510. (Step S22)

Figure 3:
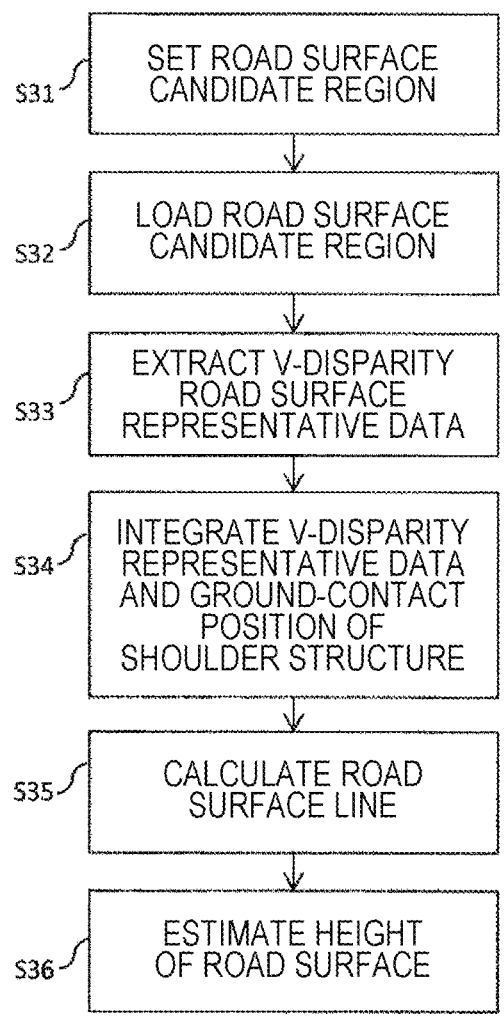
FIG. 3 is a schematic flowchart for estimating a road surface height of FIG. 1.

Next, FIG. 3 is a schematic flowchart for estimating the road surface height of FIG. 1. The road surface position estimation unit 510 first sets a region serving as a road surface candidate in the V-disparity image (Step S31). A setting method thereof is not particularly limited, but preferably includes at least any of a method of using a road surface position estimated in advance, a method of using a point at infinity of a camera as a reference for region setting, a method of using a partitioned range in a disparity image as valid road data by setting a trapezoidal shape for partitioning a road range, and a method of using detection of a lane marking to determine a road shape.

Next, the road surface position estimation unit 510 extracts disparity data included in a region which is valid and serves as a road surface candidate (Step S32). When extracting the disparity data in this Step S32, disparity data of a road surface and disparity data of an object such as a car which is likely to exist on the road surface are separated. A separation method thereof is not particularly limited, but preferably includes at least any method between a method of using a position of the shoulder structure to calculate a position of the shoulder structure closest to a road surface and a method of comparing a disparity value in the vertical direction in disparity data with a predetermined threshold to confirm that the disparity value in the vertical direction gradually decreases toward the point at infinity.

Next, the road surface position estimation unit 510 projects the disparity data of the region serving as the road surface candidate onto a V-disparity space (a coordinate space specified by the vertical axis indicating the position V in the vertical direction and the horizontal axis indicating a disparity value at the position V) to generate a histogram that represents a frequency for the disparity value of each road surface candidate, and as a result, V-disparity road surface representative data is extracted for each disparity value in the vertical direction (Step S33).

Next, the road surface position estimation unit 510 integrates information on the ground-contact position of the shoulder structure detected by the structure ground-contact position derivation unit 410 and the V-disparity road surface representative data to form data for road surface estimation (Step S34). At this time, when the height of the structure is defined in advance as in the shoulder structure 102, a virtual ground-contact position is calculated using this defined height, and the calculated ground-contact position can be used as the data for road surface estimation (see FIGS. 5(a) and 5(b)).

Next, the road surface position estimation unit 510 uses the data integrated in Step S34 to calculate a single line (road surface line) passing the vicinity of a pixel having a high histogram frequency (Step S35). Incidentally, this single road surface line may be either a straight line or a curve, or may be a line obtained by combining one or more of these straight lines and curves. Next, the road surface position estimation unit 510 estimates the height of the road surface using the road surface line calculated in Step 35 (Step S36).

Figure 4:
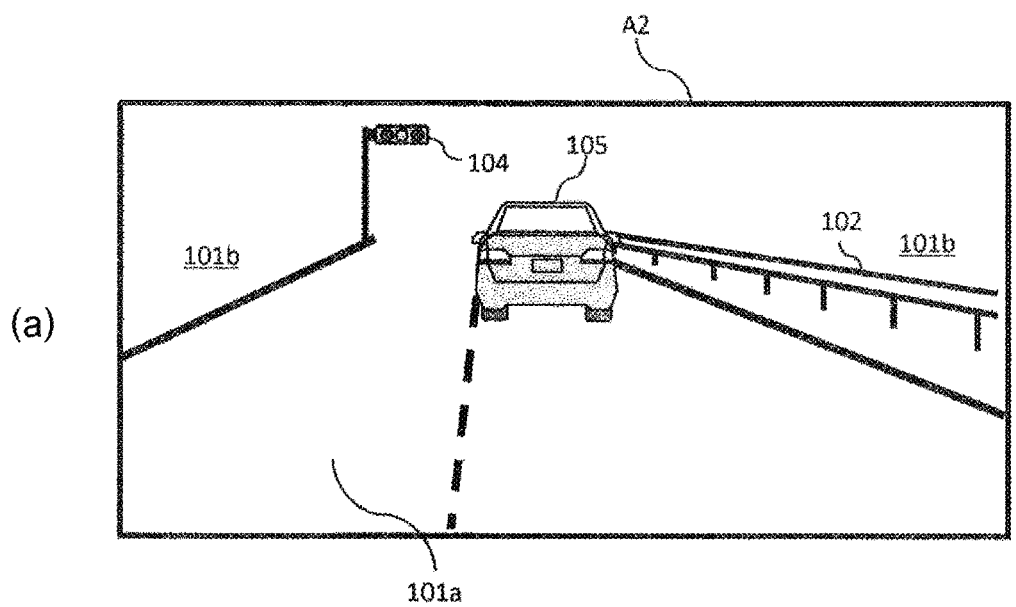
FIG. 4 is a schematic view for describing a processing process of the object detection device of FIG. 1, and FIG. 4(a) and FIG. 4(b) illustrate a scene viewed from the host vehicle and a V-disparity image each generated by a three-dimensional data generation unit, respectively.
Figure 4:
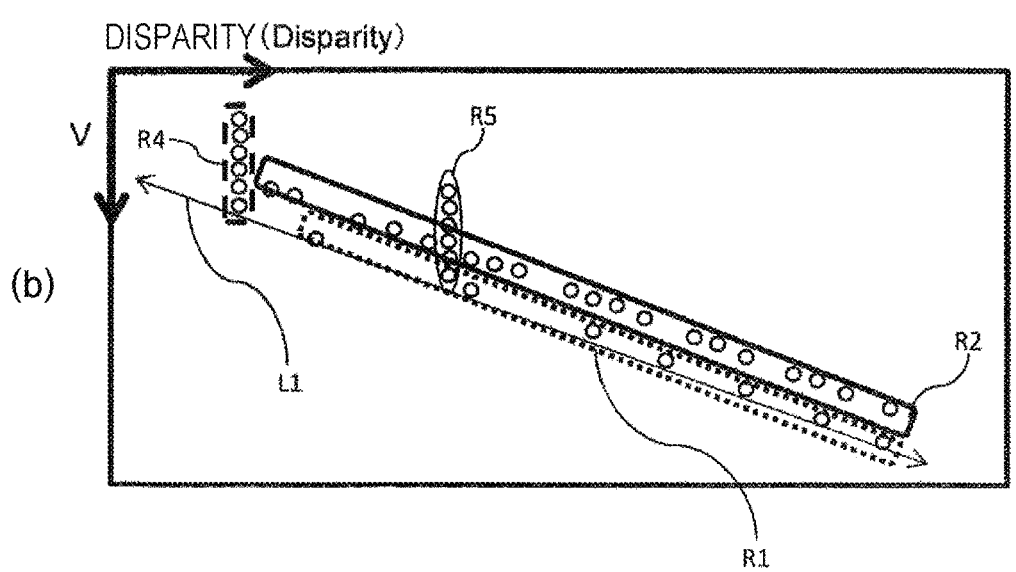
Figure 5:
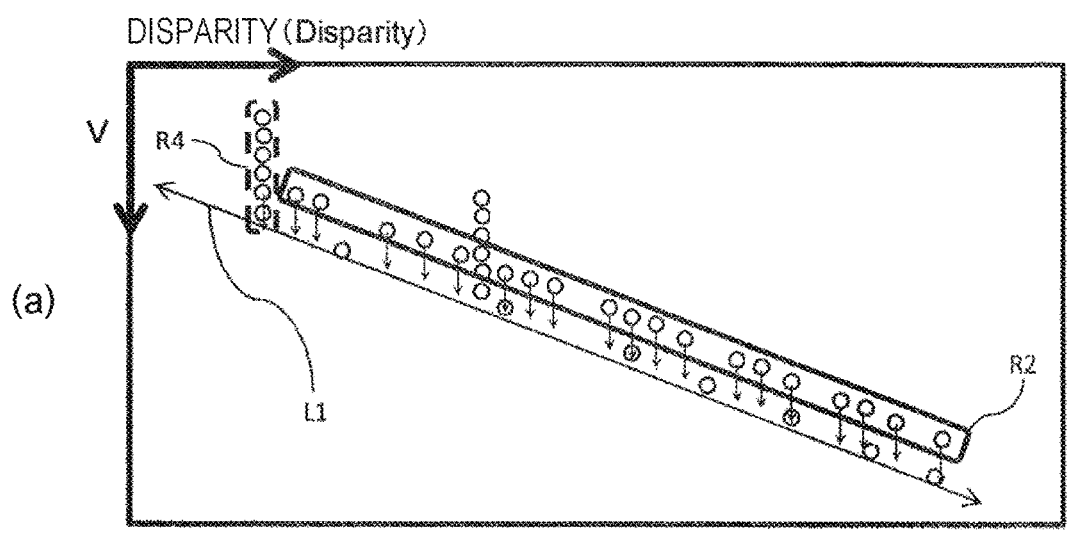
FIG. 5 is a schematic view for describing the processing process of the object detection device of FIG. 1, and FIG. 5(a) and FIG. 5(b) illustrate a V-disparity image used in a structure ground-contact position derivation unit and a V-disparity image in the middle of being processed in a road surface position estimation unit, respectively.
Figure 5:
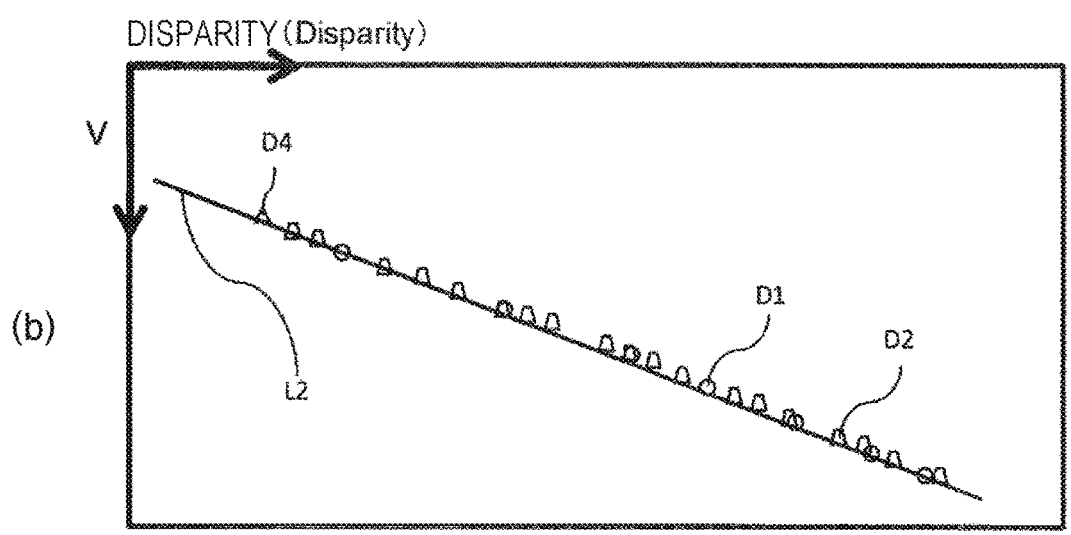
Figure 6:
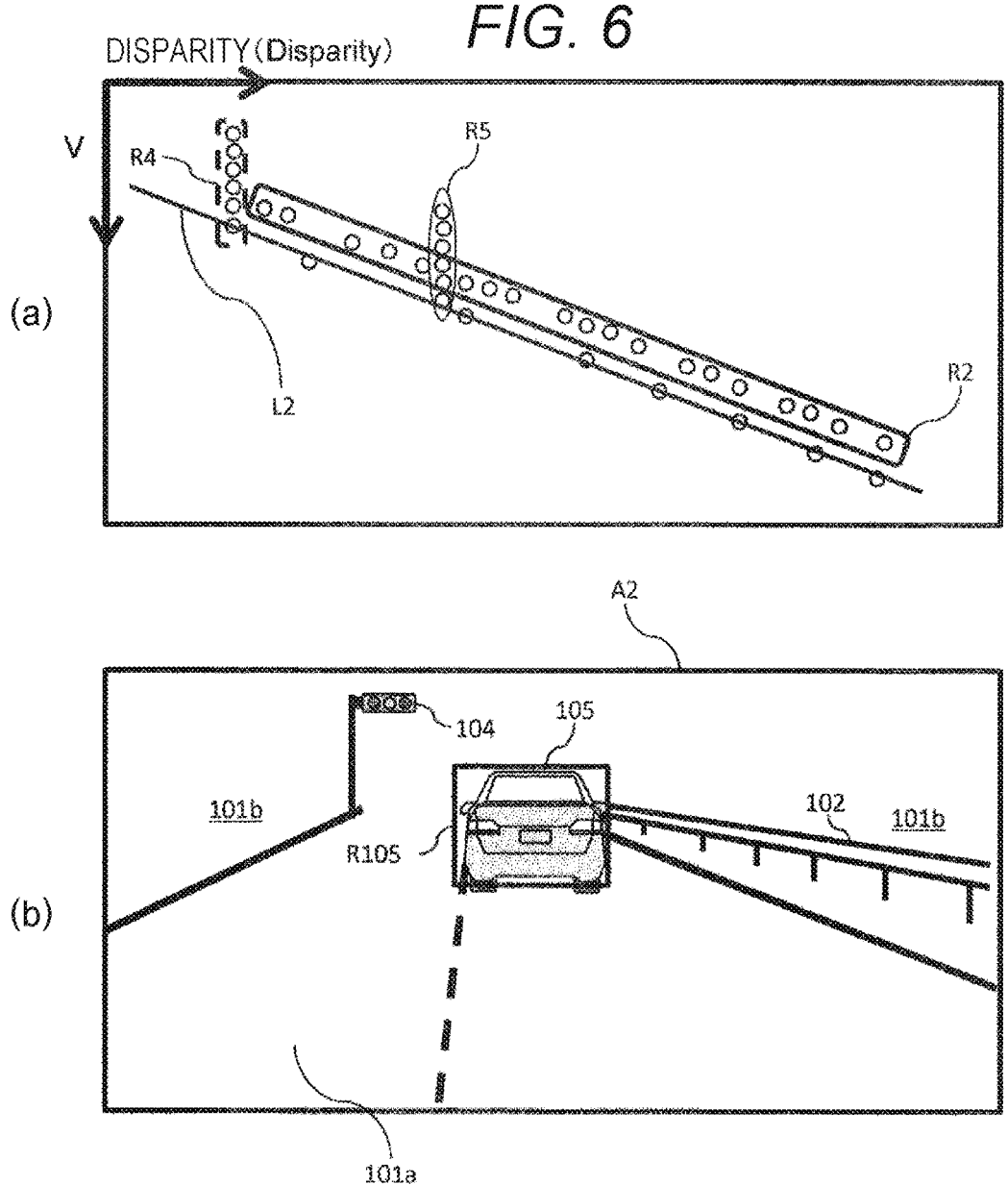
FIG. 6 is a schematic view for describing the processing process of the object detection device of FIG. 1, and FIG. 6(a) and FIG. 6(b) illustrate a V-disparity image used in the road surface position estimation unit and an object in image data detected using an object detection unit, respectively.

Next, a specific example of detecting an object using the object detection device 1 will be described with reference to FIGS. 4 to 6. In this specific example, the object detection device 1 is mounted on the host vehicle, and the object detection device 1 is used to detect the object 105 on the road surface 101a in front of the host vehicle (hereinafter also referred to as the "car 105"). In addition, it is assumed that the shoulder structure 102 (the guardrail) and the shoulder structure 104 (the traffic light) are present around the host vehicle in this specific example, as illustrated in FIG. 4(a).

In this specific example, first, the stereo camera 110 mounted on the vehicle is used to capture images of the surroundings in the progressing direction of the host vehicle including the road surface 101a and the road shoulder 101b, thereby generating image data. Then, the three-dimensional data generation unit 210 uses the image data generated by the stereo camera 110 to calculate a disparity for each pixel in this image data. Thereafter, the shoulder structure detection unit 310 detects a shoulder structure using the disparity data calculated according to Step S21 and specifies a region of the shoulder structure according to Step S22.

In the present embodiment, FIG. 4(b) illustrates a V-disparity image generated by the three-dimensional data generation unit 210. This V-disparity image illustrates disparity data (a data region R1) of the road surface 101a which has not been detected yet, disparity data (a data region R5) of the car 105 which has not been detected yet, and the shoulder structure 102 (a data region R2) and the shoulder structure 104 (a data region R4) which have been detected by the shoulder structure detection unit 310. Incidentally, a line represented by reference sign L1 in FIG. 4(b) indicates a position of a road surface which has not been detected yet but is described as a reference.

Incidentally, a disparity of the road surface 101a represented by the data region R1 is lower than other disparities of the shoulder structures 102 and 104 and the like in a scene A2 illustrated in FIG. 4(a). It is considered that a reason thereof is that it becomes difficult to calculate the disparity by stereo matching due to a uniform structure of the road surface 101a or the visibility of the road surface becomes low due to bad weather.

Next, the structure ground-contact position derivation unit 410 acquires data of the V-disparity image, and uses this data to derive ground-contact positions of the shoulder structures 102 and 104. At this time, when the shoulder structure extends in the line-of-sight direction of the stereo camera 110, such as in the shoulder structure 102, the ground-contact positions of the shoulder structure are derived at predetermined intervals along the line-of-sight direction. As described above, ground-contact positions D2 and D4 of the shoulder structures 102 and 104 illustrated in FIG. 5(b) are derived from the regions R2 and R4 in the V-disparity image corresponding to the shoulder structures 102 and 104.

Next, the road surface position estimation unit 510 extracts V-disparity road surface representative data D1 represented by the data region R1 according to Steps S31 to S33, and then, integrate the V-disparity road surface representative data D1 and the ground-contact positions D2 and D4 of the shoulder structures according to Steps S34 and S35 to calculate a road surface line L2 illustrated in FIG. 5(b). As a calculation method of the above-described road surface line L2, for example, a calculation method of performing linear approximation or the like by an approximation method, such as a least squares approximation method, can be adopted. Incidentally, the V-disparity road surface representative data D1 is indicated by a circle, and the ground-contact positions D2 and D4 are indicated by a trapezoid mark and a triangle mark, respectively, in FIG. 5(b).

Next, the road surface position estimation unit 510 estimates a road surface height using the road surface line L2 calculated as above according to Step S36. The estimated road surface height is used to specify disparity data of a segment at the same height position such as the road surface 101a.

Next, as illustrated in FIG. 6(a), the object detection unit 610 separates disparity data indicating the road surface 101a and the remaining disparity data indicating one other than the road surface 101a, and uses this separated disparity data to detect a region R105 corresponding to the car 105 on the road surface 101a and specify a position of the region R105 as illustrated in FIG. 6(b). Incidentally, the object detection unit 610 may detect the region R105 of the car 105 using the information on the ground-contact positions D2 and D4 of the shoulder structures 102 and 104 detected by the shoulder structure detection unit 310 together with the disparity data described above. As a result, the processing time required to detect the car 105 is reduced, and it is possible to more reliably prevent confusion between the disparity data corresponding to the car 105 and the disparity data corresponding to the shoulder structures 102 and 104.

Next, the control software processing unit 710 controls the host vehicle so as to cope with the car 105 detected by the object detection unit 610 (for example, to avoid approaching to the car 105, to travel following the car 105, to overtake the car 105, or the like).

As described above, the object detection device 1 includes the stereo camera 110, the three-dimensional data generation unit 210, the shoulder structure detection unit 310, the structure ground-contact position derivation unit 410, the road surface position estimation unit 510, and the object detection unit 610 described above, and thus, can accurately estimate the height of the road surface 101a using the ground-contact positions of the shoulder structures 102 and 104 and reliably detect the object 105 present on the road surface 101a.

Second Embodiment

Figure 7:
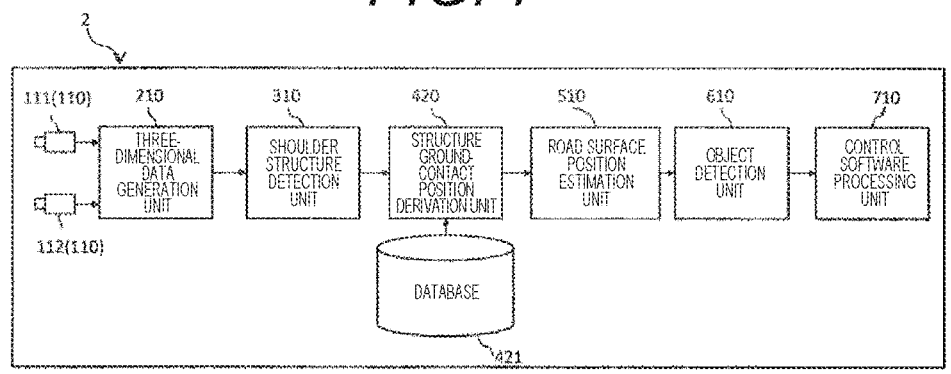
FIG. 7 is a schematic block diagram for describing a second embodiment of the present invention.

FIG. 7 is a schematic block diagram for describing a second embodiment of the present invention. As illustrated in FIG. 7, an object detection device 2 is constituted schematically by the stereo camera 110, the three-dimensional data generation unit 210, the shoulder structure detection unit 310, a structure ground-contact position derivation unit 420, a database 421, the road surface position estimation unit 510, the object detection unit 610, and the control software processing unit 710.

The second embodiment is different from the first embodiment in terms that the structure ground-contact position derivation unit 420 and the shoulder structure database 421 are provided. Incidentally, configurations other than the structure ground-contact position derivation unit 420 and the database 421 are the same as those of the first embodiment, and thus, the same parts will be denoted by the same reference signs, and detailed descriptions thereof will be omitted.

The structure ground-contact position derivation unit 420 derives a ground-contact position of a shoulder structure using disparity data of the shoulder structure and height information of the shoulder structure stored in the database 421, which will be described later, in order to estimate the ground-contact position of the detected shoulder structure. Specifically, the structure ground-contact position derivation unit 420 detects a position of the shoulder structure, and derives the ground-contact position of the shoulder structure is derived by subtracting the height from the top position using a height of the shoulder structure stored in the database 421 which will be described later.

The database 421 stores the height information of the shoulder structure. The information stored in the database 421 is not particularly limited, and may include information such as a position and a range of a shoulder structure in addition to the height information of the shoulder structure, for example.

In this manner, the object detection device 2 includes the structure ground-contact position derivation unit 420 and the database 421 described above, and thus, can more accurately and reliably derive the ground-contact position of the shoulder structure. In addition, with the above-described configuration, the object detection device 2 can indirectly derive the ground-contact position of the shoulder structure even if it is difficult to derive the ground-contact point of the shoulder structure directly for some reason.

Incidentally, the present invention is not limited to the configurations of the embodiments described above, but is defined by the scope of the claims, and is intended to include any modifications within the scope of the claims and meaning equivalent thereto.

For example, the object detection device 1 that estimates the height of the road surface 101*a* using the V-disparity road surface representative data D1 of the road surface 101*a* and the ground-contact positions D2 and D4 of the shoulder structures 102 and 104 has been described in the above-described embodiment, but an object detection device that estimates the height of a road surface only from a ground-contact position of a shoulder structure without using V-disparity road surface representative data is also included within the intended scope of the present invention.

In addition, the object detection device 1 including the control software processing unit 710 has been described in the above-described embodiments, but it is sufficient for the object detection device of the present invention to be capable of reliably detecting the object present on the road surface, and may be an object detection device that does not include a processing unit such as the control software processing unit 710.

REFERENCE SIGNS LIST

1, 2 object detection device
101*a* road surface
101*b* road shoulder
102, 103, 104 structure (shoulder structure)
105 object
110 stereo camera
210 three-dimensional data generation unit
310 shoulder structure detection unit
410, 420 structure ground-contact position derivation unit
421 database
510 road surface position estimation unit
610 object detection unit

The invention claimed is:

1. An object detection device, which detects objects upon a road surface, comprising:
   a processor configured to:
   detect an object on the road surface using image data; and
   derive a boundary position between the object and the road surface from the detected object; and
   a stereo camera configured to capture images of the road surface and a road shoulder and generating image data,
   the processor further configured to:
   use the generated image data generated by the stereo camera to generate disparity data for pixels in the generated image data;
   use the disparity data and/or the generated image data to detect a predetermined structure installed on the road shoulder;
   derive a ground-contact position of the structure detected;
   estimate a height of the road surface from the ground-contact position of the structure detected; and
   detect the object upon the road surface by using the disparity data generated and the height of the road surface estimated to separate disparity data corresponding to the road surface and disparity data other than the disparity data from the disparity data generated.

2. The object detection device according to claim 1, wherein
   the processor is configured to use the ground-contact position of the structure to estimate the height of the road surface for each position in a line-of-sight direction of the stereo camera.

3. The object detection unit according to claim 1, wherein the processor is configured to use disparity data of the structure and/or generated image data of the structure to derive the ground-contact position of the structure.

4. The object detection unit according to claim 1, further comprising
   a database in which height information of the structure is stored,
   wherein the processor is configured to use the disparity data of the structure and the height information of the structure stored in the database to derive the ground-contact position of the structure.

* * * * *